US008278939B2

(12) United States Patent
Joshi et al.

(10) Patent No.: US 8,278,939 B2
(45) Date of Patent: Oct. 2, 2012

(54) DIAGNOSTIC METHOD FOR DETERMINING DEFORMATIONS IN A TRANSFORMER WINDING

(75) Inventors: Prasad Madhukar Joshi, Satara (IN); Shrikrishna Vyankatesh Kulkarni, Mumbai (IN)

(73) Assignee: Indian Institute of Technology, Bombay, Mumbai (IN)

( * ) Notice: Subject to any disclaimer, the term of this patent is extended or adjusted under 35 U.S.C. 154(b) by 388 days.

(21) Appl. No.: 12/679,748

(22) PCT Filed: Sep. 11, 2008

(86) PCT No.: PCT/IN2008/000584
§ 371 (c)(1), (2), (4) Date: Mar. 24, 2010

(87) PCT Pub. No.: WO2009/069145
PCT Pub. Date: Jun. 4, 2009

(65) Prior Publication Data

US 2010/0211339 A1 Aug. 19, 2010

(30) Foreign Application Priority Data

Sep. 27, 2007 (IN) ........................ 1893/MUM/2007

(51) Int. Cl.
*G01R 31/06* (2006.01)

(52) U.S. Cl. ........................................ 324/547; 324/546

(58) Field of Classification Search .................. 324/546, 324/547
See application file for complete search history.

(56) References Cited

U.S. PATENT DOCUMENTS

| | | | |
|---|---|---|---|
| 4,857,856 A | 8/1989 | Coleman et al. | |
| 6,035,265 A * | 3/2000 | Dister et al. | 324/765.01 |
| 6,466,034 B1 * | 10/2002 | Wang et al. | 324/547 |
| 2005/0099187 A1 | 5/2005 | Ryder | |
| 2008/0300807 A1 * | 12/2008 | Marti et al. | 702/66 |

FOREIGN PATENT DOCUMENTS

WO WO2005/091004 9/2005

OTHER PUBLICATIONS

International Search Report dated Sep. 1, 2009 for related International Application No. PCT/IN2008/000584.

Written Opinion dated Sep. 1, 2009 for related International Application No. PCT/IN2008/000584.

* cited by examiner

*Primary Examiner* — Timothy J Dole

(74) *Attorney, Agent, or Firm* — Klein, O'Neill & Singh, LLP

(57) ABSTRACT

A diagnostic method for determining deformations in a transformer winding including the steps of representing the winding as a lumped parameter circuit and dividing the winding into at least two sections; generating a first set of fingerprint values based on capacitive values of the winding; the first set of finger print values indicating the location and extent of radial deformation in the winding; generating a second set of fingerprint values based on capacitive values of the winding; the second set of finger prints indicating the location and extent of axial deformation in the winding and determining the location and extent of radial or axial deformation or combination of both radial and axial deformation in the winding by comparing the measured values with the first set and second set of finger print values.

12 Claims, 2 Drawing Sheets

DIAGNOSTIC METHOD FOR DETERMINING DEFORMATIONS IN A TRANSFORMER WINDING

FIELD OF INVENTION

This invention relates to a diagnostic method for determining deformations in a transformer winding.

BACKGROUND OF INVENTION

Transformers are one of the important components of a power system and are used to step up or step down voltage levels in the power system. Deformations in the transformer winding will cause malfunctioning of the transformer and may even lead to explosion of the transformer thereby giving rise to damages to the other components of the power system and accidents. Therefore, it is essential to detect and determine deformations in the transformer winding to ensure normal operation of the transformer and power system, obtain expected operational life of the transformer and to prevent accidents. The transformer winding comprises at least one phase winding. In a three phase transformer, the transformer winding comprises three phase windings which may be connected in delta or star connection. Deformations in the winding may be axial or radial in nature depending upon the displacement of the transformer windings with respect to the transformer core in the axial or radial direction. Frequency Response Analysis (FRA) is widely used for detection of deformations in the transformer winding. The FRA method comprises, generation of a reference set or fingerprint values of transfer functions by applying a voltage (V) at different frequencies to the line end of the winding with the neutral end of the winding grounded and measuring the transfer function (In/V, in which In is the current flowing into the neutral end of the winding) for each frequency. These transfer function values are plotted to form a finger-print graph. At the time of detection of deformations in the winding, similar measurements for the winding are made and similar graph is plotted using the measured transfer function. The graph representing the subsequent measurements is superimposed on the fingerprint graph and the differences, if any, between the curves of the two graphs are examined visually for deformations. Visual examination and analysis of the differences between the two graphs is subjective and may vary from person to person and may not provide a proper and accurate evaluation of the deformations. Several hundreds of measurements at various frequencies are required for plotting both the graphs. This is quite inconvenient and cumbersome to carryout. Although comparison of the two graphs indicates presence of deformation, if any, it does not indicate the location, nature and extent of the deformation.

OBJECTS OF INVENTION

An object of the invention is to provide a diagnostic method for determining deformations in a transformer winding, which method is accurate and reliable and indicates the location of deformation in a winding and also indicates whether the deformation in the winding is radial or axial or combination of both axial and radial and the extent of deformation.

Another object of the invention is to provide a diagnostic method for determining deformations in a transformer winding, which method is simple and easy to carry out.

BRIEF DESCRIPTION OF THE DRAWINGS

The following is a brief description of the invention with reference to the accompanying drawings, in which.

DETAILED DESCRIPTION OF THE INVENTION

Figure 1:
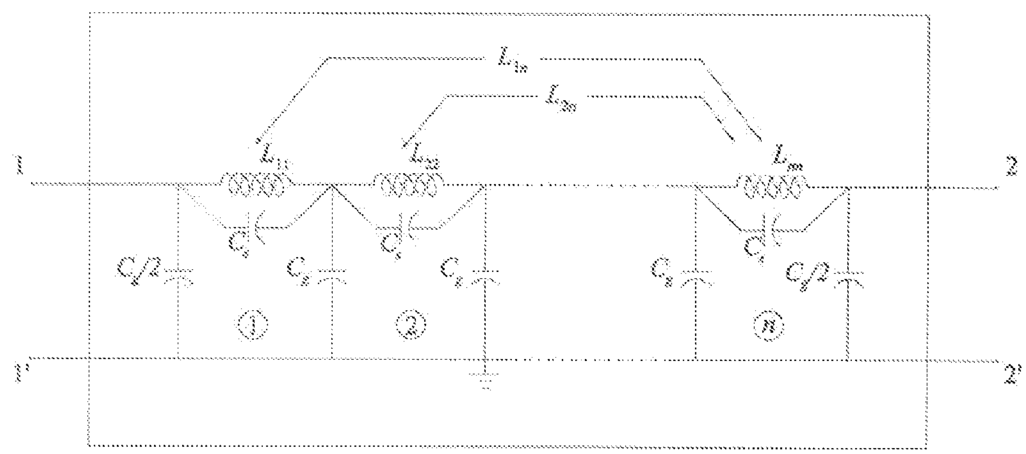
FIG. 1 is a lumped parameter circuit representation of a transformer winding.
Figure 2:
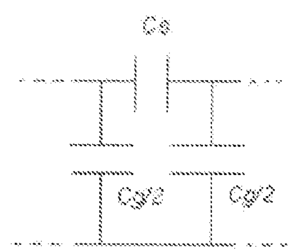
FIG. 2 is a pi ($\pi$) model representation of each section of the transformer winding of FIG. 1 at the selected high frequency.
Figure 3:
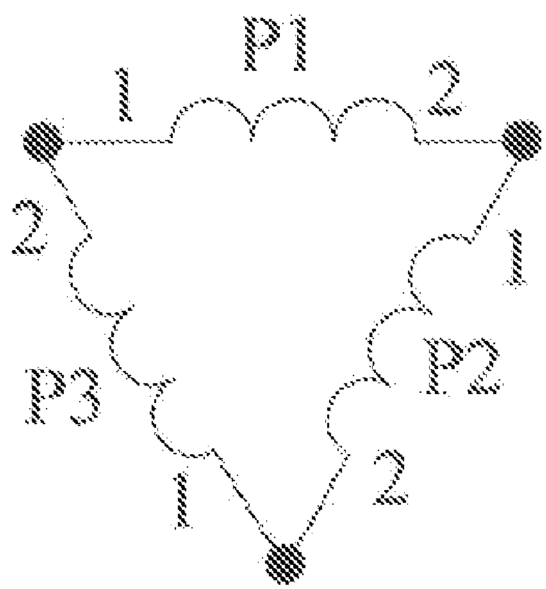
FIG. 3 is a representation of the three phase windings of the transformer winding of FIG. 1 connected in delta configuration.
Figure 4:
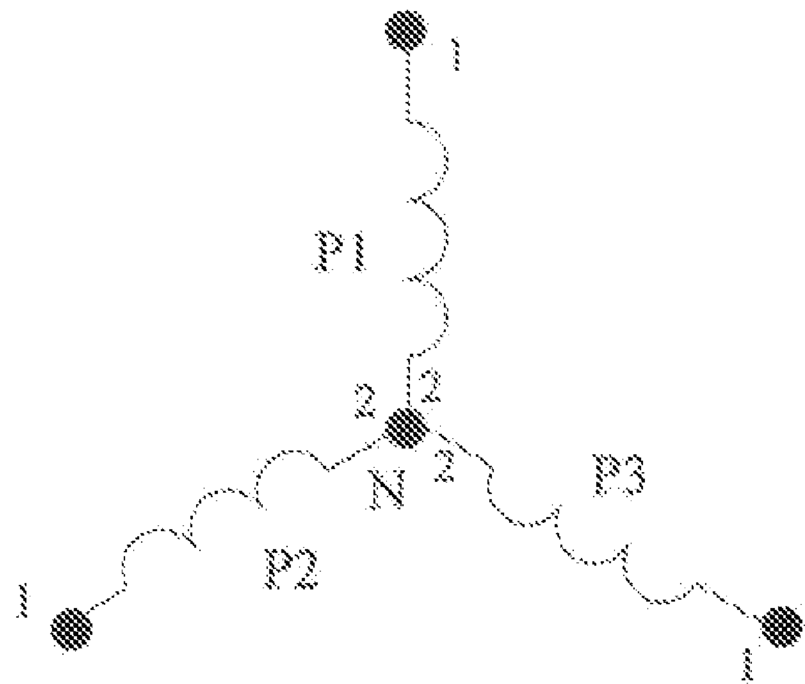
FIG. 4 is a representation of the three phase windings of the transformer winding of FIG. 1 connected in star configuration.

In FIG. 1 of the accompanying drawings, each section of the transformer winding comprises elements like series capacitance ($C_s$), self inductance ($L_{ii}$), mutual inductance ($L_{ij}$) and ground capacitance ($C_g$). Each section of the winding is represented by a pi ($\pi$) model at the selected high frequency as illustrated in FIG. 2 of the accompanying drawings, in which two legs are given by $C_g/2$. In FIGS. 3 and 4, the three phase windings of the transformer winding are marked P1, P2 and P3.

According to invention there is provided method for determining deformations in a transformer winding, comprising the steps of:

A. Representing the winding as a lumped parameter circuit and dividing the winding into at least two sections.

B. Generating a first set of fingerprint values based on capacitive values of the winding. The first set of finger print values indicating the location and extent of radial deformation in the winding is as follows:

(i) Measuring the terminal capacitance C1 between one end of the winding and one ground terminal at a high frequency beyond which the terminal impedance of the winding remains capacitive, while keeping the other end of the winding and the other ground terminal disconnected; measuring the terminal capacitance C2 between other end of the winding and the other ground terminal at the same high frequency, while keeping the one end of the winding and the one ground terminal disconnected; measuring the capacitance C3 across the two ends of the winding at the same high frequency; measuring the terminal capacitance C4 between one end of the winding and one ground terminal or other end of the winding and the other ground terminal at a low frequency at which the terminal impedance of the winding is predominantly capacitive in nature, while keeping disconnected the winding end and ground terminal, at which the measurement is not taken;

(ii) Calculating the sectional series capacitance ($C_s$) and the sectional ground capacitance ($C_g$) of each of the different sections of the winding using the values of C3 and C4 obtained in step B(i);

(iii) Simulating a range of deformations in each of the sections of the winding by changing the sectional ground capacitance $C_g$ obtained in step B(ii) by predetermined percentages and generating simulated terminal capacitance values C1', C2', C3' and C4' under the same conditions and procedures corresponding to C1, C2, C3 and C4, respectively in step B(i) for each change of the sectional ground capacitance;

(iv) Calculating deformation coefficient which is a non-limiting function of (C1–C1')/(C2–C2') for each of the sections of the winding for each change of the sectional ground capacitance $C_g$ made in step B(iii);

(iva) Forming the first set of finger prints using the deformation coefficients obtained in the step above. The first set of finger prints indicating the location of the radially deformed section of the winding; and (v) Calculating the difference between C4 in step B(i) and C4' obtained in step B(iii). A difference in the values indicating the extent of radial deformation in the deformed section of the winding.

C. Generating a second set of fingerprint values based on capacitive values of the winding. The second set of finger prints indicating the location and extent of axial deformation in the winding as follows:

(vi) Simulating a range of deformations in each of the sections of the winding by changing the sectional series capacitance $C_s$ obtained in step B(ii) by predetermined percentages and generating simulated terminal capacitance values C1" and C2" and capacitance value C3" under the same conditions and procedures corresponding to C1, C2 and C3, respectively in step B(i) for each of the said range of deformation percentages;

(vii) Calculating the deformation coefficient which is a non-limiting function of (C1−C1")/(C2−C2") for each of the sections of the winding for each change of the sectional series capacitance $C_s$ made in step C(vi);

(viia) Forming one part of second set of finger prints using the deformation coefficients obtained in the step above. The one part of second set of fingerprints indicating the location of the axially deformed section of the winding;

(viii) Calculating the difference between C3 obtained in step B(i) and C3" obtained in step C(vi) for each section of the winding for each change of the sectional series capacitance in step C(vi); and (viiia) Forming second part of finger prints using the differences obtained in the step above. The second part of the second set of fingerprints indicating the extent of the axial deformation in the deformed section of the winding.

D. Determining the location and extent of radial or axial deformation or combination of both radial and axial deformation in the winding as follows:

(i) Measuring the terminal capacitance values C1'", C2'", C4'" and capacitance value C3'" as explained in step B(i);

(ii) Comparing the values of C1 with C1'" and C2 with C2'". No difference in the values indicating that the winding has not been deformed. Carrying out the following steps (iii)-(vi) for locating the deformed section of the winding and for determining whether the deformation in the section is radial or axial or combination of both radial and axial and its extent, if there is a difference between the values.

(iii) Comparing the values of C4 with C4'". A difference in the values indicating a radial deformation in the winding and its extent. Calculating the deformation coefficient which is a non-limiting function of (C1−C1'")/(C2−C2'") for identifying the section of the winding which has been radially deformed. Comparing the calculated deformation coefficient with the fingerprints of deformation coefficients obtained in step B(iv) for locating the section of the winding which has been radially deformed;

(iv) Comparing the difference between C3' corresponding to the deformed section located in the above step and C3'". The difference C3'"−C3', if any, indicating that a section of the winding has also been axially deformed. Comparing C3'"−C3' with C3 for knowing the extent of axial deformation. Comparing the difference obtained with the fingerprints of the differences in step C(viiia); and (v) No difference between the values of C4 and C4'" indicating that a section of the winding has been axially deformed. Identifying the axially deformed section by comparing the deformation coefficient calculated in D(iii) with the fingerprints of deformation coefficients obtained in step C(vii) for locating the section of the winding which has been axially deformed.

(vi) Comparing C3'" with C3. Comparing the difference between C3'" and C3 with the fingerprints in step C(viiia) for knowing the extent of axial deformation.

The deformations in the three phase windings of a transformer connected in delta configuration is calculated according to the invention as follows:

E. Represent the phase winding P1 (refer FIG. 3) as a lumped parameter circuit as shown in FIG. 1 and divide P1 into eight uniform sections. FIG. 2 illustrates each section of P1 at the selected high frequency.

F. Generate a first set of fingerprint values based on capacitive values of P1. The first set of finger print values indicates the location and extent of radial deformation in P1 as follows:

(i) Measure the terminal capacitance C1 between one end of P1 and one ground terminal (1-1') at a high frequency beyond which the terminal impedance of P1 remains capacitive, while keeping the other end of P1 and the other ground terminal (2-2') disconnected; measure the terminal capacitance C2 between other end of P1 and the ground terminal (2-2') at the same high frequency, while keeping the one end of P1 and the one ground terminal (1-1') disconnected; measure the capacitance C3 across the two ends (1-2) of P1 at the same high frequency; measure the terminal capacitance C4 between one end of P1 and one ground terminal (1-1') or other end of P1 and the ground terminal (2-2') at a low frequency at which the terminal impedance of P1 is predominantly capacitive in nature, while keeping disconnected P1 end and ground terminal, at which the measurement is not taken.

(ii) Calculate the sectional series capacitance ($C_s$) and the sectional ground capacitance ($C_g$) of each of the eight sections of P1 using the values of C3 and C4 obtained in step F (i). ($C_g$) and ($C_s$) are calculated as follows:

$$C_g = C4/(\text{number of sections})$$

i.e. $C_g = C4/24$ and $$C_s = kC_g,$$

where, k is a positive real number and is determined by $$\frac{C_3}{C_g} = \frac{1}{2}\left[\frac{3k^8 + 64k^7 + 336k^6 + 672k^5 + 660k^4 + 352k^3 + 104k^2 + 16k + 1}{8k^7 + 84k^6 + 252k^5 + 330k^4 + 220k^3 + 78k^2 + 14k + 1}\right]$$

(iii) Simulate a range of deformations in each of the eight sections of P1 by changing the sectional ground capacitance $C_g$ obtained in step F(ii) by predetermined percentages and generate simulated terminal capacitance values C1', C2', C3' and C4' under the same conditions and procedures corresponding to C1, C2, C3 and C4, respectively in step F(i) for each change of the sectional ground capacitance.

(iv) Calculate the deformation coefficient for each of the eight sections of P1 for each change of the sectional ground capacitance $C_g$ made in step F(iii). The deformation co-efficient is calculated as $\log_{10}$ [(C1−C1')/(C2−C2')].

(iva) Form the first set of finger prints using the deformation coefficients. The first set of fingerprints indicates the location of the radially deformed section of P1; and (v) Calculate the difference between C4 in step F(i) and C4' obtained in step F(iii). A difference in the values indicates the extent of radial deformation in the deformed section of the P1.

G. Generate a second set of fingerprint values based on capacitive values of P1. The second set of finger prints indicates the location and extent of axial deformation in P1 as follows.

(vi) Simulate a range of deformations in each of the eight sections of P1 by changing the sectional series capacitance $C_s$ obtained in step F(ii) by predetermined percentages and generate simulated terminal capacitance values C1" and C2" and capacitance value C3" under the same conditions and procedures corresponding to C1, C2 and C3, respectively in step F(i) for each of the said range of deformation percentages;

(vii) Calculate the deformation coefficient for each of the eight sections of P1 for each change of the sectional series capacitance $C'_s$ made in step G(vi). The deformation co-efficient is calculated as $\log_{10}$ [(C1−C1")/(C2−C2")].

(viia) Form one part of a second set of finger prints using the deformation coefficients obtained in the step above. This one part of second set of fingerprints indicates the location of the axially deformed section of P1;

(viii) Calculate the difference between C3 obtained in step F(i) and C3" obtained in step G(vi) for each section of P1 for each change of the sectional series capacitance in step G(vi); and (viiia) Forming second part of the second set of finger prints using the differences. This second part of the second set of fingerprints indicates the extent of the axial deformation in the deformed section of P1.

H. Repeat the steps in F and G for the other two phase windings P2 and P3 for generation of two sets of fingerprint values for the other two phase windings P2 and P3.

I. Determine the location and extent of radial or axial deformation or combination of both radial and axial deformation in the phase windings as follows:

(i) Measure the terminal capacitance values C1", C2''', C4''' and capacitance value C3''' as explained in step F (i) for P1;

(ii) Compare the values of C1 with C1''' and C2 with C2''' for P1. No difference in the values indicating that P1 has not been deformed. Carry out the following steps (iii)-(vi) for locating the deformed section of P1 and for determining whether the deformation in the section is radial or axial or combination of both radial and axial and its extent, if there is a difference between the values;

(iii) Compare the values of C4 with C4'''. A difference in the values indicates a radial deformation in P1 and its extent. Calculate the deformation coefficient for identifying the section of P1 which has been radially deformed. Compare the calculated deformation coefficient with the fingerprints of deformation coefficients obtained in step F(iv) for locating the section of P1 which has been radially deformed. The deformation coefficient is calculated as $\log_{10}$ [(C1−C1''')/(C2−C2''')].

(iv) Compare the difference between C3' corresponding to the deformed section located in the above step and C3'''. The difference C3'''−C3', if any, indicates that a section of P1 has also been axially deformed. Compare C3'''−C3' with C3 for knowing the extent of axial deformation. Compare the difference obtained with the fingerprints of the differences in step G(viiia).

(v) No difference between the values of C4 and C4''' indicates that a section of P1 has been axially deformed. Identify the axially deformed section by comparing the deformation coefficient calculated in I(iii) with the fingerprints of deformation coefficients obtained in step G(viia) for locating the section of P1 which has been axially deformed.

(vi) Compare C3''' with C3. Compare the difference between C3''' and C3 with the fingerprints of the differences in step G (viiia) for knowing the extent of axial deformation.

(vii) Repeat the steps in I(i) to I(vi) for each of the other two phase windings P2 and P3 for determining the location and extent of axial or radial or combination deformation in that phase winding.

The deformations in the three phase windings of a transformer connected in star configuration is calculated according to the invention as follows:

J. Represent the phase winding P1 (refer FIG. 4) as a lumped parameter circuit as shown in FIG. 1 and divide P1 into eight uniform sections. FIG. 2 illustrates each section of P1 for the selected high frequency.

K. Generate a first set of fingerprint values based on capacitive values of P1. The first set of finger print values indicates the location and extent of radial deformation in P1, as follows:

(i) Measure the terminal capacitance C1 between one end of P1 and ground terminal (1-1') at a high frequency beyond which the terminal impedance of P1 remains capacitive, while keeping the neutral end (N) and the ground terminal (2-2') disconnected; measure the terminal capacitance C2 between neutral N and the ground terminal (2-2') at the same high frequency, while keeping the one end of P1 and the one ground terminal (1-1') disconnected; measure the capacitance C3 across the two ends of P1 (one end and neutral N) end at the same high frequency; short one ends of all phase windings P1, P2 and P3 and measure the capacitance C3*a* across the one end of P1 and neutral N at the same high frequency; measure the terminal capacitance C4 between one end of P1 and one ground terminal (1-1') or neutral N and the other ground terminal (2-2') at a low frequency at which the terminal impedance of P1 is predominantly capacitive in nature.

(ii) Calculate the sectional series capacitance ($C_s$) and the sectional ground capacitance ($C_g$) of each of the eight sections of P1 using the values of C3*a* and C4 obtained in step K(i). $C_g$ and $C_s$ are calculated as follows:

$$C_g = C4/(\text{number of sections})$$

$$\text{i.e. } C_g = C4/24 \text{ and}$$

$$C_s = kC_g,$$

where, k is a positive real number and is determined by $$\frac{C3a}{C_g} = \frac{3}{4}\left[\frac{2k^4 + 16k^3 + 20k^2 + 8k + 1}{4k^3 + 10k^2 + 6k + 1}\right]$$

(iii) Simulate a range of deformations in each of the sections of P1 by changing the sectional ground capacitance $C_g$ obtained in step K(ii) by predetermined percentages and generate simulated terminal capacitance values C1', C2', C3', C3*a*', and C4' under the same conditions and procedures corresponding to C1, C2, C3, C3*a* and C4, respectively in step K(i) for each change of the sectional ground capacitance;

(iv) Calculate the deformation coefficient for each of the eight sections of P1 for each change of the sectional ground capacitance $C_g$ made in step K(iii). The deformation co-efficient is calculated as $\log_{10}$ [(C1−C1')/(C2−C2')].

(iva) Form the first set of finger prints using the deformation coefficients. The first set of fingerprints indicates the location of the radially deformed section of P1; and (v) Calculating the difference between C4 in step K(i) and C4' obtained in step K(iii). A difference in the values indicates the extent of radial deformation in the deformed section of P1.

L. Generate a second set of fingerprint values based on capacitive values of P1. The second set of finger prints indicates the location and extent of axial deformation in P1 as follows:

(vi) Simulate a range of deformations in each of the eight sections of P1 by changing the sectional series capacitance $C_s$ obtained in step K(ii) by predetermined percentages and generate simulated terminal capacitance values C1" and C2" and capacitance value C3" under the same conditions and procedures corresponding to C1, C2 and C3, respectively in step K(i) for each of the said range of deformation percentages;

(vii) Calculate the deformation coefficient for each of the eight sections of P1 for each change of the sectional series capacitance $C_s$ made in step L(vi). The deformation co-efficient is calculated as $\log_{10}$ [(C1−C1")/(C2−C2")].

(viia) Form one part of a second set of the finger prints using the deformation coefficients. This one part of second set of fingerprints indicates the location of the axially deformed section of P1;

(viii) Calculate the difference between C3 obtained in step K(i) and C3" obtained in step L(vi) for each section of P1 for each change of the sectional series capacitance in step L(vi); and (viiia) Form a second part of the finger prints using the differences. This second part of the second set of fingerprints indicates the extent of the axial deformation in the deformed section of P1.

M. Repeat the steps in K and L for each of the other two phase windings P2 and P3 for generation of fingerprint values for the other two phase windings P2 and P3.

N. Determine the location and extent of radial or axial deformation or combination of both radial or axial deformation in the phase windings as follows:

(i) Measure the terminal capacitance values C1'", C2'", C4'" and capacitance value C3'" as explained in step K(i) for P1;

(ii) Compare the values of C1 with C1'" and C2 with C2'". No difference in the values indicating that P1 has not been deformed. Carry out the following steps (iii)-(vi) for locating the deformed section of P1 and for determining whether the deformation in the section is radial or axial or combination of both radial and axial and its extent, if there is a difference between the values.

(iii) Compare the values of C4 with C4'". A difference in the values indicates a radial deformation in P1 and its extent. Calculate the deformation coefficient for identifying the section of P1 which has been radially deformed. Compare the calculated deformation coefficient with the fingerprints of deformation coefficients obtained in step K(iv) for locating the section of P1 which has been radially deformed. The deformation coefficient is calculated as $\log_{10}$ [(C1−C1'")/(C2−C2'")].

(iv) Compare the difference between C3' corresponding to the deformed section located in the above step and C3'". The difference between C3'"−C3', if any, indicates that a section of P1 has also been axially deformed. Compare C3'"−C3' with C3 for knowing the extent of axial deformation. Compare the difference obtained with the fingerprints of the differences in step L(viiia).

(v) No difference between the values of C4 and C4'" indicates that a section of P1 has been axially deformed. Identify the axially deformed section by comparing the deformation coefficient calculated in N(iii) is compared with the fingerprints of deformation coefficients obtained in step L(viia) for locating the section of P1 which has been axially deformed.

(vi) Compare C3'" with C3. Compare the difference between C3 and C3'" with the fingerprints of the differences in step L(viiia) for knowing the extent of axial deformation.

(vii) Repeat the steps in N(i) to N(vi) for each of the other two phase windings P2 and P3 for determining the location and extent of deformation in that phase winding.

According to the method of the invention it is possible to determine easily and accurately the location of deformation in a winding and whether the deformation in the winding is radial or axial or combination of both axial and radial and also the extent of deformation. Only four capacitance measurements (C1, C2, C3 and C4) are required for generation of the fingerprints. The method of the invention is thus simple, easy and convenient to carry out, and is also reliable. Therefore, any deformations in the winding can be easily detected and timely remedial action can be taken to prevent malfunctioning of the transformer. Damages to the other components of the power system and accidents due to malfunctioning of the transformer also can be prevented.

The transformer winding may be divided into non-uniform sections. The deformations in the transformer winding may be determined for multiple sections of the winding. The location and extent of deformation may be determined for any current carrying coil besides transformer winding. Such variations of the invention are to be construed and understood to be within the scope of the invention.

The invention claimed is:

1. A diagnostic method for determining deformations in a transformer winding, comprising the steps of:

A. representing the winding as a lumped parameter circuit and dividing the winding into at least two sections;

B. generating a first set of fingerprint values based on capacitive values of the winding; the first set of finger print values indicating the location and extent of radial deformation in the winding is as follows:

(i) measuring a terminal capacitance C1 between one end of the winding and one ground terminal at a high frequency beyond which the terminal impedance of the winding remains capacitive, while keeping the other end of the winding and the other ground terminal disconnected; measuring a terminal capacitance C2 between the other end of the winding and the other ground terminal at the same high frequency, while keeping the one end of the winding and the one ground terminal disconnected; measuring a capacitance C3 across the two ends of the winding at the same high frequency; measuring a terminal capacitance C4 between one end of the winding and one ground terminal or the other end of the winding and the other ground terminal at a low frequency at which the terminal impedance of the winding is predominantly capacitive in nature, while keeping disconnected the winding end and ground terminal, at which the measurement is not taken;

(ii) calculating the sectional series capacitance (Cs) and the sectional ground capacitance (Cg) of each of the different sections of the winding using the values of C3 and C4 obtained in step B(i);

(iii) simulating a range of deformations in each of the sections of the winding by changing the sectional ground capacitance Cg obtained in step B(ii) by predetermined percentages and generating simulated terminal capacitance values C1', C2', C3' and C4' under the same conditions and procedures corresponding to C1, C2, C3 and C4, respectively in step B(i) for each change of the sectional ground capacitance;

(iv) calculating a deformation coefficient which is a non-limiting function of (C1−C1')/(C2−C2') for each of the sections of the winding for each change of the sectional ground capacitance Cg made in step B(iii);

(iva) forming the first set of finger prints using the deformation coefficients obtained in the step above, the first set of finger prints indicating the location of the radially deformed section of the winding; and (v) calculating the difference between C4 in step B(i) and C4' obtained in step B(iii), a difference in the values indicating the extent of radial deformation in the deformed section of the winding;

C. generating a second set of fingerprint values based on capacitive values of the winding, the second set of finger prints indicating the location and extent of axial deformation in the winding as follows:

(vi) simulating a range of deformations in each of the sections of the winding by changing the sectional series capacitance Cs obtained in step B(ii) by predetermined percentages and generating simulated terminal capacitance values C1" and C2" and capacitance value C3" under the same conditions and procedures corresponding to C1, C2 and C3, respectively in step B(i) for each of the said range of deformation percentages;

(vii) calculating the deformation coefficient which is a non-limiting function of (C1−C1")/(C2−C2") for each of the sections of the winding for each change of the sectional series capacitance Cs made in step C(vi);

(viia) forming one part of the second set of finger prints using the deformation coefficients obtained in the step above, the one part of the second set of fingerprints indicating the location of the axially deformed section of the winding;

(viii) calculating the difference between C3 obtained in step B(i) and C3" obtained in step C(vi) for each section of the winding for each change of the sectional series capacitance in step C(vi); and (viiia) forming a second part of the second set of finger prints using the differences obtained in the step above, the second part of the second set of fingerprints indicating the extent of the axial deformation in the deformed section of the winding;

D. determining the location and extent of radial or axial deformation or combination of both radial and axial deformation in the winding as follows:

(i) measuring the terminal capacitance values C1''', C2''', C4''' and capacitance value C3''' as explained in step B(i);

(ii) comparing the values of C1 with C1''' and C2 with C2''', wherein no difference in the values indicates that the winding has not been deformed, carrying out the following steps (iii)-(vi) for locating the deformed section of the winding and for determining whether the deformation in the section is radial or axial or combination of both radial and axial and its extent, if there is a difference between the values;

(iii) comparing the values of C4 with C4''', a difference in the values indicating a radial deformation in the winding and its extent, calculating the deformation coefficient which is a non-limiting function of (C1−C1''')/(C2−C2''') for identifying the section of the winding which has been radially deformed, comparing the calculated deformation coefficient with the fingerprints of deformation coefficients obtained in step B(iv) for locating the section of the winding which has been radially deformed;

(iv) comparing the difference between C3' corresponding to the deformed section located in the above step and C3''', the difference C3'''−C3', if any, indicating that a section of the winding has also been axially deformed, comparing C3'''−C3' with C3 for knowing the extent of axial deformation, comparing the difference obtained with the fingerprints of the differences in step C(viiia); and (v) wherein no difference between the values of C4 and C4''' indicates that a section of the winding has been axially deformed, identifying the axially deformed section by comparing the deformation coefficient calculated in D(iii) with the fingerprints of deformation coefficients obtained in step C(vii) for locating the section of the winding which has been axially deformed, and (vi) comparing C3''' with C3, comparing the difference between C3''' and C3 with the fingerprints in step C(viiia) for knowing the extent of axial deformation.

2. A method as claimed in claim 1, wherein the transformer winding is divided into eight uniform sections and Cg and Cs of step B(ii) are calculated as follows:

$C_g = C4/(\text{number of sections})$ $C_g = C4/8$ and $C_s = kC_g$, where, k is a positive real number and is determined by $$\frac{C3}{C_g} = \frac{1}{4}\left[\frac{2k^4 + 16k^3 + 20k^2 + 8k + 1}{4k^3 + 10k^2 + 6k + 1}\right].$$

3. A method as claimed in claim 1 or 2, wherein the deformation co-efficient in steps B(iv) and C(vii) and D(iii) is calculated as $\log_{10}$ [(C1−C1')/(C2−C2')] and $\log_{10}$ [(C1−C1")/(C2−C2")] and $\log_{10}$ [(C1−C1''')/(C2−C2''')], respectively.

4. A method as claimed in claim 1, wherein the selected high and low frequencies in step B(i) lie between 1 MHz-10 MHz and 50 Hz-100 Hz, respectively.

5. A diagnostic method for determining deformations in a transformer winding comprising three phase windings connected in a delta configuration comprising the steps of:

E. representing one phase winding as a lumped parameter circuit and dividing the phase winding into at least two sections;

F. generating a first set of fingerprint values based on capacitive values of the phase winding, the first set of finger print values indicating the location and extent of radial deformation in the phase winding as follows:

(i) measuring a terminal capacitance C1 between one end of the phase winding and one ground terminal at a high frequency beyond which the terminal impedance of the phase winding remains capacitive, while keeping the other end of the phase winding and the other ground terminal disconnected; measuring a terminal capacitance C2 between the other end of the phase winding and the other ground terminal at the same high frequency, while keeping the one end of the phase winding and the one ground terminal disconnected; measuring a capacitance C3 across the two ends of the phase winding at the same high frequency; measuring a terminal capacitance C4 between one end of the phase winding and one ground terminal or the other end of the phase winding and the other ground terminal at a low frequency at which the terminal impedance of the phase winding is predominantly capacitive in nature, while keeping disconnected the phase winding end and ground terminal, at which the measurement is not taken;

(ii) calculating the sectional series capacitance (Cs) and the sectional ground capacitance (Cg) of each of the different sections of the phase winding using the values of C3 and C4 obtained in step F (i);

(iii) simulating a range of deformations in each of the sections of the phase winding by changing the sectional ground capacitance Cg obtained in step F(ii) by predetermined percentages and generating simulated terminal capacitance values C1', C2', C3' and C4' under the same conditions and procedures corresponding to C1, C2, C3 and C4, respectively in step F(i) for each change of the sectional ground capacitance;

(iv) calculating the deformation coefficient which is a non-limiting function of (C1−C1')/(C2−C2') for each of the sections of the phase winding for each change of the sectional ground capacitance Cg made in step F(iii);

(iva) forming the first set of finger prints using the deformation coefficients, first set of fingerprints indicating the location of the radially deformed section of the phase winding; and (v) calculating the difference between C4 in step F(i) and C4' obtained in step F(iii), a difference in the values indicating the extent of radial deformation in the deformed section of the phase winding G. generating a second set of fingerprint values based on capacitive values of the phase winding, the second set of finger prints indicating the location and extent of axial deformation in the phase winding as follows:

(vi) simulating a range of deformations in each of the sections of the phase winding by changing the sectional series capacitance Cs obtained in step F(ii) by predetermined percentages and generating simulated terminal capacitance values C1" and C2" and capacitance value C3" under the same conditions and procedures corresponding to C1, C2 and C3, respectively in step F(i) for each of the said range of deformation percentages;

(vii) calculating the deformation coefficient which is a non-limiting function of (C1−C1")/(C2−C2") for each of the sections of the phase winding for each change of the sectional series capacitance Cs made in step G(vi);

(viia) forming one part of the second set of finger prints using the deformation coefficients obtained in the step above, the one part of the second set of fingerprints indicating the location of the axially deformed section of the phase winding;

(viii) calculating the difference between C3 obtained in step F(i) and C3" obtained in step G(vi) for each section of the phase winding for each change of the sectional series capacitance in step G(vi); and (viiia) forming a second part of the second set of finger prints using the differences, the second part of the second set of fingerprints indicating the extent of the axial deformation in the deformed section of the phase winding H. repeating the steps in F and G for the other two phase windings for generation of two sets of fingerprint values for the other two phase windings;

I. determining the location and extent of radial or axial deformation or combination of both radial and axial deformation in the phase windings as follows:

(i) measuring the terminal capacitance values C1''', C2''', C4''' and capacitance value C3''' as explained in step F (i) for each phase winding;

(ii) comparing the values of C1 with C1''' and C2 with C2''' for each phase winding; wherein no difference in the values indicates that the phase windings have not been deformed, carrying out the following steps (iii)-(vi) for locating the deformed section of the phase winding and for determining whether the deformation in the section is radial or axial or combination of both axial and radial and its extent, if there is a difference between the values for any one of the phase windings;

(iii) comparing the values of C4 with C4''', a difference in the values indicating a radial deformation in phase winding and its extent, calculating the deformation coefficient which is a non-limiting function of [(C1−C1''')/(C2−C2''')] for identifying the section of the phase winding which has been radially deformed, comparing the calculated deformation coefficient with the fingerprints of deformation coefficients obtained in step F(iv) for the phase winding for locating the section of the phase winding which has been radially deformed;

(iv) comparing the difference between C3' corresponding to the deformed section located in the above step and C3''', the difference C3'''−C3', if any, indicating that a section of the phase winding has also been axially deformed, comparing C3'''−C3' with C3 for knowing the extent of axial deformation, comparing the difference obtained with the fingerprints of the differences in step G(viiia);

(v) wherein no difference between the values of C4 and C4''' indicating indicates that a section of the phase winding has been axially deformed, identifying the axially deformed section by comparing the deformation coefficient calculated in I(iii) with the fingerprints of deformation coefficients obtained in step G(viia) for locating the section of the phase winding which has been axially deformed;

(vi) comparing C3''' with C3, comparing the difference between C3''' and C3 with the fingerprints of the differences in step G (viiia) for knowing the extent of axial deformation; and (vii) repeating the steps in I(i) to I(vi) for each of the other two phase windings for determining the location and extent of axial or radial or combination deformation in that phase winding.

6. A method as claimed in claim 5, wherein each phase winding is divided into eight uniform sections and Cg and Cs are calculated as follows:

$$C_g = C4/(\text{number of sections})$$

$$\text{i.e. } C_g = C4/24 \text{ and}$$

$$C_s = kC_g,$$

where, k is a positive real number and is determined by $$\frac{C_3}{C_g}=\frac{1}{2}\left[\frac{3k^8+64k^7+336k^6+672k^5+660k^4+352k^3+104k^2+16k+1}{8k^7+84k^6+252k^5+330k^4+220k^3+78k^2+14k+1}\right].$$

7. A method as claimed in claim 5 or 6, wherein the deformation co-efficient in steps F(iv), G(vii) and I(iii) is calculated as $\log_{10}$ [(C1−C1')/(C2−C2')] and $\log_{10}$ [(C1−C1")/(C2−C2")] and $\log_{10}$ [(C1−C1'")/(C2−C2'")] respectively.

8. A method as claimed in claim 5, wherein the selected high and low frequencies in step F(i) lie between 1 MHz-10 MHz and 50 Hz-100 Hz, respectively.

9. A diagnostic method for determining deformations in a transformer winding comprising three phase windings connected in a star configuration comprising the steps of:

J. representing one phase winding as a lumped parameter circuit and dividing the phase winding into at least two sections, K. generating a first set of fingerprint values based on capacitive values of the phase winding, the first set of finger print values indicating the location and extent of radial deformation in the phase winding, as follows:

(i) measuring a terminal capacitance C1 between one end of the phase winding and one ground terminal at a high frequency beyond which the terminal impedance of the winding remains capacitive, while keeping the neutral and the other ground terminal disconnected; measuring a terminal capacitance C2 between neutral and the other ground terminal at the same high frequency, while keeping the one end of the phase winding and the one ground terminal disconnected; measuring a capacitance C3 across the two ends of the phase winding (one end and neutral) at the same high frequency; shorting one end of all phase windings and measuring a capacitance C3*a* across the one end of the phase winding and neutral at the same high frequency; measuring a terminal capacitance C4 between one end of the phase winding and one ground terminal or neutral end of the phase winding and the other ground terminal at a low frequency at which the terminal impedance of the phase winding is predominantly capacitive in nature;

(ii) calculating the sectional series capacitance (Cs) and the sectional ground capacitance (Cg) of each of the different sections of the phase winding using the values of C3*a* and C4 obtained in step K(i);

(iii) simulating a range of deformations in each of the sections of the phase winding by changing the sectional ground capacitance Cg obtained in step K(ii) by predetermined percentages and generating simulated terminal capacitance values C1', C2', C3', C3*a*', and C4' under the same conditions and procedures corresponding to C1, C2, C3, C3*a* and C4, respectively in step K(i) for each change of the sectional ground capacitance;

(iv) calculating the deformation coefficient which is a non-limiting function of (C1−C1')/(C2−C2') for each of the sections of the phase winding for each change of the sectional ground capacitance Cg made in step K(iii);

(iva) forming the first set of finger prints using the deformation coefficients, first set of fingerprints indicating the location of the radially deformed section of the phase winding; and (v) calculating the difference between C4 in step K(i) and C4' obtained in step K(iii), a difference in the values indicating the extent of radial deformation in the deformed section of the phase winding;

L. generating a second set of fingerprint values based on capacitive values of the phase winding, the second set of finger prints indicating the location and extent of axial deformation in the phase winding as follows:

(vi) simulating a range of deformations in each of the sections of the phase winding by changing the sectional series capacitance Cs obtained in step K(ii) by predetermined percentages and generating simulated terminal capacitance values C1" and C2" and capacitance value C3" under the same conditions and procedures corresponding to C1, C2 and C3, respectively in step K(i) for each of the said range of deformation percentages;

(vii) calculating the deformation coefficient which is a non-limiting function of (C1−C1")/(C2−C2") for each of the sections of the phase winding for each change of the sectional series capacitance Cs made in step L(vi);

(viia) forming one part of the second set of finger prints using the deformation coefficients, the one part of second set of fingerprints indicating the location of the axially deformed section of the phase winding;

(viii) calculating the difference between C3 obtained in step K(i) and C3" obtained in step L(vi) for each section of the phase winding for each change of the sectional series capacitance in step L(vi); and (viiia) forming a second part of the second set of finger prints using the differences, the second part of the second set of fingerprints indicates the extent of the axial deformation in the deformed section of the phase winding;

M. repeating the steps in K and L for each of the other two phase windings for generation of fingerprint values for the other two phase windings;

N. determining the location and extent of radial or axial deformation or combination of both radial and axial deformation in the phase windings as follows:

(i) measuring the terminal capacitance values C1'", C2'", C4'" and capacitance value C3'" as explained in step K(i);

(ii) comparing the values of C1 with C1'" and C2 with C2'", wherein no difference in the values indicates that the phase winding has not been deformed, carrying out the following steps (iii)-(vi) for locating the deformed section of the phase winding and for determining whether the deformation in the section is radial or axial or combination and its extent, if there is a difference between the values;

(iii) comparing the values of C4 with C4'", a difference in the values indicating a radial deformation in the phase winding and its extent, calculating the deformation coefficient as a non-limiting function of [(C1−C1'")/(C2−C2'")] for identifying the section of the winding which has been radially deformed, comparing the calculated deformation coefficient with the fingerprints of deformation coefficients obtained in step K(iv) for locating the section of the phase winding which has been radially deformed, (iv) comparing the difference between C3' corresponding to the deformed section in the above step and C3'", the difference C3'"−C3', if any, indicating that a section of the phase winding has also been axially deformed, comparing C3'''−C3' with C3 for knowing the extent of axial deformation, comparing the difference obtained with the fingerprints of the differences in step L(viiia);

(v) wherein no difference between the values of C4 and C4''' indicates that a section of the phase winding has been axially deformed, identifying the axially deformed section by comparing the deformation coefficient calculated in N(iii) with the fingerprints of deformation coefficients obtained in step L(viia) for locating the section of the phase winding which has been axially deformed;

(vi) comparing C3''' with C3, comparing the difference between C3 and C3''' with the fingerprints of the differences in step L(viiia) for knowing the extent of axial deformation; and (vii) repeating the steps in N(i) to N(vi) for each of the other two phase windings for determining the location and extent of deformation in that phase winding.

10. A method as claimed in claim 9, wherein each phase winding is divided into eight uniform sections and Cg and Cs in step K(ii) are calculated as follows:

$$C_g = C4/(\text{number of sections})$$

$$\text{i.e. } C_g = C4/24 \text{ and}$$

$$C_s = kC_g,$$

where, k is a positive real number and is determined by $$\frac{C3a}{C_g} = \frac{3}{4}\left[\frac{2k^4 + 16k^3 + 20k^2 + 8k + 1}{4k^3 + 10k^2 + 6k + 1}\right].$$

11. A method as claimed in claim 9 or 10, wherein the deformation co-efficient in step K(iv), L(vii) and N(iii) is calculated as $\log_{10}$ [(C1−C1')/(C2−C2')] and $\log_{10}$ [(C1−C1'')/(C2−C2'')] and $\log_{10}$ [(C1−C1''')/(C2−C2''')].

12. A method as claimed in claim 9, wherein the selected high and low frequencies in step K(i) lie between 1 MHz-10 MHz and 50 Hz-100 Hz, respectively.

* * * * *